June 13, 1967 G. D. HUNTER 3,325,227
CULTIVATOR CLAMP
Filed Jan. 15, 1965

INVENTOR.
GEORGE D. HUNTER
BY
John C. Thompson
ATTORNEY

United States Patent Office 3,325,227
Patented June 13, 1967

3,325,227
CULTIVATOR CLAMP
George D. Hunter, Des Moines, Iowa, assignor to Deere & Company, Moline, Ill., a corporation of Delaware
Filed Jan. 15, 1965, Ser. No. 425,835
3 Claims. (Cl. 306—1.5)

ABSTRACT OF THE DISCLOSURE

A cultivator clamp of special construction for securing cultivator shanks of either round or rectangular cross section to a tool bar.

---

The present invention relates generally to agricultural implements and more particularly to a cultivator clamp for securing cultivator tool shanks of different cross sectional configurations to square tool bar.

The principal object of the present invention is to provide a clamp structure which is capable of firmly holding either round shanked tools or rectangular shanked tools firmly to a tool bar of square cross section.

Another object of the present invention is to provide a structure in which a single adjusting means is used, the adjusting means bearing against the cultivator tool shank through a plurality of points.

A further object of the present invention is to provide a cultivator tool shank clamp which is of relatively low cost and simple design.

These and other objects and advantages of this invention will be apparent to those skilled in the art after a consideration of the following detailed description, taken in conjunction with the accompanying drawings in which the preferred form of this invention is illustrated.

Figure 1:
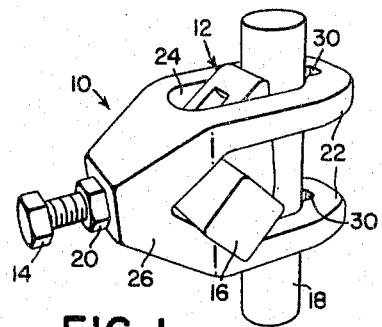
FIG. 1 is a perspective view showing the clamp assembled with a cultivator tool shank and tool bar.

Referring first to FIG. 1, it will be seen that the clamp of the present invention includes a generally U-shaped clamping member, indicated generally at 10, a clamping block, indicated generally at 12, and a threaded cap screw 14. The parts are assembled in the manner shown in FIG. 1 and rigidly hold together a tool bar 16 at right angles to a cultivator tool shank 18. A jam nut 20 is threaded on the cap screw 14 and is used to non-rotatably secure the cap screw 14 to the U-shaped clamping member 10 to hold the pieces firmly together in their assembled position.

Figure 2:
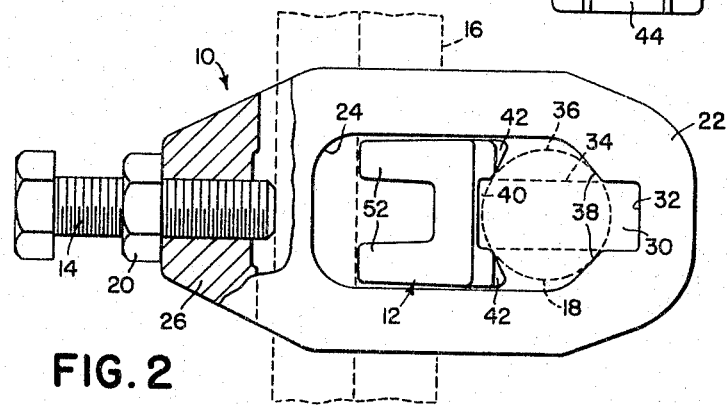
FIG. 2 is a plan view showing the structure of FIG. 1 in a slightly enlarged scale.
Figure 3:
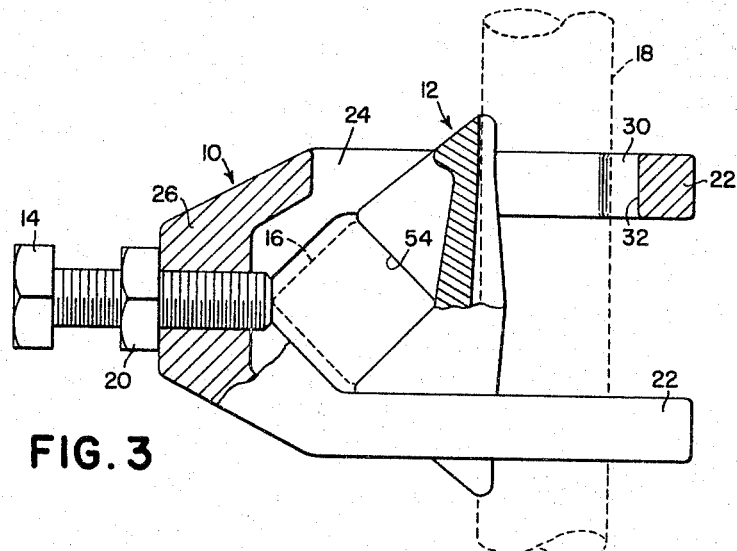
FIG. 3 is a side elevation of the assembly shown in FIG. 2.

The U-shaped clamping member is provided with upper and lower spaced apart legs 22 which are suitably apertured as at 24. An intermediate bight portion 26 interconnects the legs 22, the bight portion being provided with threaded aperture means to receive the cap screw 14. The threaded aperture means can be in the form of a nut non-rotatably held within a mating aperture within the bight, or in the form of a threaded aperture as is illustrated in FIGS. 2 and 3. The aperture 24 in the legs 22 is provided at that end remote from the bight portion with a generally rectangular notch 30 whose face 32 is disposed on a plane generally normal to the longitudinally extending axis of that aperture which receives the cap screw 14. The purpose of the rectangular notch is to matingly engage rectangular cultivator tool shanks such as the type illustrated by the brogen lines 34 in FIG. 2. To matingly engage a circular shank, such as the type shown in FIG. 1 or by the dotted lines 36 in FIG. 2, the outer end of the aperture 34 is provided with angled surface means 38.

Figure 4:
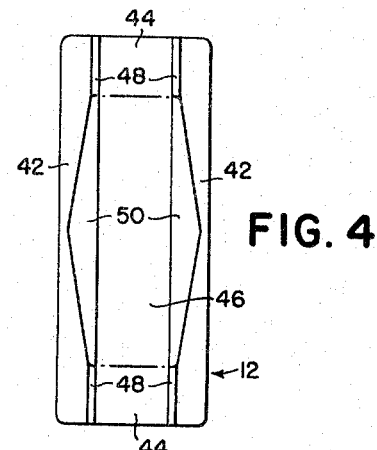
FIG. 4 is a front elevation view of the clamping block.

The clamping block 12 is provided with a cultivator tool shank engaging side (FIG. 4) and a tool bar engaging side. The cultivator tool shank engaging side is provided with a channel 40 (FIG. 2) disposed between outwardly projecting sides 42. The channel portion is provided with end bearing surfaces 44 which are interconnected by an inwardly extending intermediate portion 46. Disposed to either side of the end bearing surfaces are end engaging surfaces 48. The outwardly projecting sides 42 are provided with a relieved portion 50 which interconnects opposed and engaging surfaces 48 on each side.

The tool bar engaging side of the clamping block is provided with ribs 52 that are provided in turn with a cut-out portion 54 that matingly engages the tool bar 16.

The manner of operation of applicant's device should be obvious from the foregoing description. However, it should be noted that the clamp of the present invention is adapted to rigidly secure both round and rectangular shanks at right angles to a tool bar 16. Thus, when the parts are assembled in the manner illustrated in the drawings, the clamping block 12 is brought to bear against a cultivator tool shank of either of the foregoing descriptions at a plurality of points, the shank in turn bearing against the end of the aperture also at a plurality of points. Thus, when a rectangular shank is employed, the clamping block bears against the shank on the surfaces 44, and the rectangular shank 34 in turn bears against the outer faces 32 in the generally rectangular notches 30, there being upper and lower notches as can best be seen from FIG. 1. When a circular shank is to be carried by the tool bar 16, it is to be noted that the shank 36 is engaged by the four end-engaging surfaces 48, and that the shank of circular cross section in turn bears against the upper and lower surfaces 38. Also, it should be noted that the tool bar engaging side of the clamping block 12 engages the tool bar at opposed points, there being a space between the ribs 52 to this purpose.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. The combination of a tool bar, a ground cultivator tool shank, and means to hold the shank at substantially right angles to the tool bar, said means including a generally U-shaped clamping member having spaced apart apertured legs and an intermediate bight portion having an aperture provided with internally threaded means, the inner end of the aperture terminating between the spaced apart legs, a clamping block having a cultivator tool shank engaging side and a tool bar engaging side, the cultivator tool shank engaging side having a channel disposed between outwardly projecting sides, each of the sides having a relieved portion disposed between end-engaging surfaces, the tool bar engaging side having a cut-out portion corresponding generally to the cross-section of the tool bar, and fastener means threaded in the aperture within said bight, the parts being so arranged and constructed that the fastener means may be brought to bear against the tool bar, which in turn bears against the cut-out portion of the clamping block, the end engaging surfaces of the clamping block in turn bearing against the circular cultivator tool shank, which in turn bears against the end of the apertures in said legs.

2. Means for clamping a vertically extending cultivator tool shank to a horizontally extending tool bar having a substantially regular polygonal cross-section comprising: a U-shaped clamping member having upper and lower spaced apart apertured legs and an intermediate bight, said bight portion being provided with a normally longitudinally extending aperture provided with internally threaded means, the apertures in the upper and lower legs having in one end a generally rectangular notch one side of which being disposed generally normal to the axis of the aperture in the bight portion; a clamping block having a cultivator tool shank engaging side and a tool bar engaging side, the cultivator tool shank engaging side having a channel disposed between outwardly projecting sides, said channel having an inwardly extending intermediate portion disposed between end bearing surfaces, each of the sides having a relieved portion disposed between end engaging surfaces, the tool bar engaging side having a cut-out portion corresponding generally to the cross-section of the tool bar; and a cap screw disposed within said longitudinally extending aperture, the parts being so arranged and constructed that when the clamping means is assembled with the shank and the bar and the cap screw is brought to bear against the tool bar, which in turn bears against the cut-out portion of the clamping block, which in turn bears against the cultivator tool shank, which in turn bears against the ends of the apertures in the spaced apart legs, the assembly is held rigidly together.

3. The combination of a horizontally extending tool bar having a substantially rectangular polygonal cross-section, a cultivator tool shank having a substantially circular cross-section, and means for clamping the shank at a substantially right angle to the tool bar, said means including a U-shaped clamping member having upper and lower spaced apart aperture legs and an intermediate bight, said bight portion being provided with a normally longitudinally extending aperture provided with internally threaded means, a clamping block having a cultivator tool shank engaging side and a tool bar engaging side, the cultivator tool shank engaging side having a channel disposed between outwardly projecting sides, each of the sides having a relieved portion disposed between end engaging surfaces, the tool bar engaging side having a cut-out portion corresponding generally to the cross-section of the tool bar, and a cap screw disposed within said longitudinally extending aperture, the parts being so arranged and constructed that when the cap screw is brought to bear against the tool bar, which in turn bears against the cut-out portion of the clamping block, the end engaging surfaces of the clamping block in turn bearing against the circular cultivator tool shank, which in turn bears against the end of the apertures in said legs, the assembly is rigidly held together.

References Cited
UNITED STATES PATENTS

| | | | |
|---|---|---|---|
| 1,437,266 | 11/1922 | Palmer-Jones | 287—54 |
| 2,655,088 | 10/1953 | Charley | 306—1.5 |
| 2,805,877 | 9/1957 | Ashley | 287—54 |
| 3,252,522 | 5/1966 | Taylor | 172—763 X |

FOREIGN PATENTS

| | | |
|---|---|---|
| 524,740 | 12/1953 | Belgium. |
| 463,198 | 7/1928 | Germany. |
| 322,560 | 12/1929 | Great Britain. |

CARL W. TOMLIN, *Primary Examiner.*

A. D. KUNDRAT, *Assistant Examiner.*